United States Patent
Mieszelewicz

(10) Patent No.: US 7,641,241 B2
(45) Date of Patent: Jan. 5, 2010

(54) METHOD OF CORROSION PROTECTION AT A WELDED PIPE JOINT AND RESULTING JOINT

(75) Inventor: Gienek Mieszelewicz, Brighton (AU)

(73) Assignee: Tyco Water Pty Limited, Nolora (AU)

( * ) Notice: Subject to any disclaimer, the term of this patent is extended or adjusted under 35 U.S.C. 154(b) by 389 days.

(21) Appl. No.: 10/574,811

(22) PCT Filed: Nov. 19, 2004

(86) PCT No.: PCT/AU2004/001612

§ 371 (c)(1),
(2), (4) Date: Apr. 5, 2006

(87) PCT Pub. No.: WO2005/050081

PCT Pub. Date: Jun. 2, 2005

(65) Prior Publication Data

US 2007/0040381 A1    Feb. 22, 2007

(30) Foreign Application Priority Data

Nov. 20, 2003 (AU) ............................. 2003906412

(51) Int. Cl.
*F16L 21/02* (2006.01)
(52) U.S. Cl. .................... 285/374; 285/45; 285/230; 285/288.1
(58) Field of Classification Search ................ 285/45, 285/55, 230, 288.1, 374
See application file for complete search history.

(56) References Cited

U.S. PATENT DOCUMENTS

| | | | | |
|---|---|---|---|---|
| 2,273,154 A | * | 2/1942 | Stromsoe | 285/55 |
| 2,662,555 A | * | 12/1953 | Hirsh | 285/290.1 |
| 4,548,427 A | * | 10/1985 | Press et al. | 285/55 |
| 4,871,197 A | * | 10/1989 | Codding et al. | 285/231 |
| 5,274,897 A | * | 1/1994 | Mieszelewicz et al. | 29/458 |

FOREIGN PATENT DOCUMENTS

| | | |
|---|---|---|
| DE | 576841 C | 5/1933 |
| FR | 2772109 A | 6/1999 |

* cited by examiner

*Primary Examiner*—Aaron M Dunwoody
*Assistant Examiner*—Fannie Kee
(74) *Attorney, Agent, or Firm*—Wyatt B. Pratt; Daniel N. Daisak

(57) ABSTRACT

A pipe joint, and a method of forming a pipe joint between two metallic pipes which have been internally and/or externally coated with a material to prevent corrosion includes a spigot and a socket. The socket has, or is formed with, an internal circumferential groove (6) that provides a seating for an elastomeric sealing ring (8). An extension or lip (13) forward from the groove provides a welding location (14) remote from the sealing ring. The coating on the end of the socket if necessary is removed to facilitate welding. The spigot has a heat sink member (9) to enable the lip of the socket to be welded to the metal of the spigot.

10 Claims, 1 Drawing Sheet

METHOD OF CORROSION PROTECTION AT A WELDED PIPE JOINT AND RESULTING JOINT

TECHNICAL FIELD

The present invention relates to a method of providing for the corrosion protection, joint deflection and end restraint of pipelines that have been coated and lined with either a thermoplastic or other material that would be affected by heat from arc welding of the joint between the pipes being joined. These joints are comprised of interconnecting spigots and sockets with interposed elastomeric sealing rings.

BACKGROUND ART

These joints incorporating elastomeric rings have been in common use on pipeline systems for many years. They provide a cost effective method of joining pipes and have been generally proven to be very reliable in service. By themselves, however, they do not provide end restraint, which is to say that they will not prevent the joints between pipes from becoming separated if the lie of the pipeline could lead to this possibility. This situation is possible where the pipeline direction changes and no other steps are taken to account for the pressure thrust so generated.

With previous joints attempts to weld plastic coated and lined pipes, and thereby to provide the necessary restraint, has resulted in the heat being conducted through the steel on the spigot causing damage to the internal lining. Additionally with these joints heat was conducted along the lip of the socket and into the area where the elastomeric ring resides. This heat then softens the internal coating of the socket which causes the elastomeric material of the rings to expand radially and the compression force of the ring between the internal surface of the socket and the external surface of the spigot diminishes. This loss of compression enables water to leak past the elastomeric sealing ring and into the welded joint area where corrosion can take place.

Another method of joining pipes that does provide full restraint is an externally welded lap weld. This method is only applicable when the lining material is cement mortar. The inherent flaw in this method is that there is always an exposed steel section inside the pipe that can corrode when exposed to certain water chemistry. This method is also not applicable when the lining is of a plastic or other similar type coating.

The present invention provides a system that allows the joint to be formed and deflected to the required angle, and welded while still maintaining the continuous internal corrosion protection coating.

DISCLOSURE OF THE INVENTION

In accordance with the present invention, there is provided a pipe joint between two metallic pipes which have been internally and/or externally coated with a material to prevent corrosion, said joint including a spigot and a socket, said socket having an internal circumferential groove that provides a seating for an elastomeric sealing ring, and forwardly of which groove an extension is provided which provides a welding location remote from the sealing ring with the coating on the end of the socket if necessary having been removed to facilitate welding, said spigot having a heat sink member to enable the lip of the socket to be welded to the metal of the spigot.

In accordance with the present invention there is also provided a method of forming a pipe joint between the spigot and socket ends of a pair of metallic pipes which have been internally and/or externally coated with a material to prevent corrosion, said method including forming a groove to provide a seat for a sealing ring and also forming a lip to enable said socket to overlap a heat sink member on the spigot and in contact with the metal of said spigot, and wherein the said lip is welded to said heat sink member.

BRIEF DESCRIPTION OF THE DRAWINGS

One preferred embodiment of the present invention will now be described with reference to the accompanying drawings, in which.

BEST MODES FOR CARRYING OUT THE INVENTION

Figure 1:
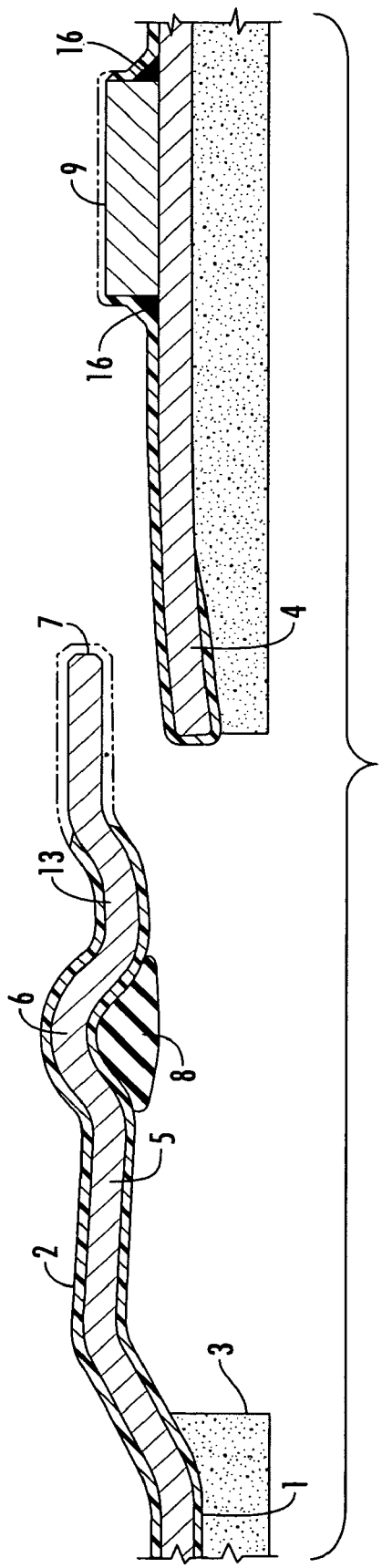
FIG. 1 is a cross-sectional view of one side of the joint prior to assembly.
Figure 2:
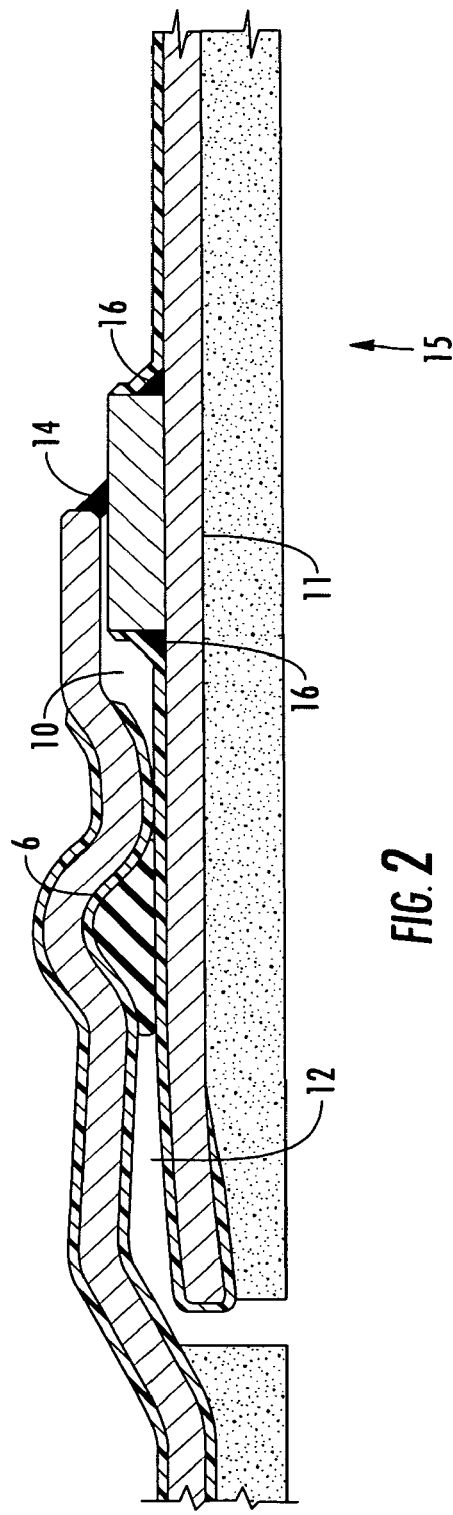
FIG. 2 is a similar cross-sectional view after assembly.

The joint consists of an expanded socket with a rolled groove (6) that has been coated to providing a seating for an elastomeric sealing ring (8). The area in front of the sealing groove is called the lip (13). In order to provide the restraint, the lip is extended and flared outwards to provide a suitable welding position (7) remote from the elastomeric sealing ring. The coating on the end of the socket lip has been removed to facilitate welding. The mating spigot has a heat sink member in the form of a band (9) attached to the outside to enable the lip to be fillet welded at (14) to the heat sink member without causing a critical rise in temperature of the inside surface of the pipe (11).

When the spigot is pushed into the socket the elastomeric sealing ring prevents internal fluid from entering the welded joint region (10). The lip of the socket overlaps the heat sink member and the member is of sufficient width to allow for the axial deflection of the pipes at the joint (15). When the joint is completed by full circumference welding at (14) the external exposed steel surface is corrosion protected by the use of a heat shrunk sleeve (not shown). The internal surfaces up to and under the elastomeric sealing ring (around area 12) are coated with a thermoplastic material that provides a barrier coating against corrosion. This plastic material may be continued along the full length of the bore of the pipe or it may be terminated some 30 to 50 mm under a cement mortar lining. In so doing the steel surface is totally isolated from the fluid within the pipe joint by the barrier coating and the cement mortar lining.

The method of this preferred embodiment includes the following steps:

a. Expansion of the socket end to a predetermined size using specially shaped dies.

b. Groove rolling the seat (6) for the elastomeric seal (8) and profiling the lip area (7/13) to enable it to overlap the heat sink member (9).

c. Formation of the spigot (4) by either collapsing in a tapered die or cold bending in a set of rotary dies.

d. Attachment of the heat sink member to the spigot using two continuous fillet welds (16).

e. Blasting the external surface of the pipe to a minimum of Class 2½ finish.

f. Blasting the internal surface near the ends (or full length where required) to a minimum of Class 2½ finish.

g. Heating the pipe body to a preferred temperature with the pipe body near the ends heated to a second (higher) preferred temperature.

h. Immersing the hot rotating pipe in a fluidized bed of coating powder with the immersion process being controlled by a time/temperature function.

i. Placing the coated pipe on cooling racks to allow the complete melt through of the coating and subsequent cooling by natural or fan assisted airflow.

j. Where the internal coating (lining) is not continuous along the full length of the pipe and another material is being overlaid i.e. cement mortar lining, the termination of the plastic coating is beveled down to the steel surface using a beveling machine.

k. Reinstatement of holding or support areas.

l. Application of other overlapping lining material (where applicable).

Also in accordance with the preferred embodiment of the present invention an internally corrosion resistant sealed pipe joint is provided that, by externally welding, involves the following basic steps:

a. Cold expansion of the pipe socket followed by rotary profiling and sizing of the groove and extended pipe lip.

b. Grit blasting the inner and outer surfaces of the pipe.

c. Heating the pipe.

d. Applying a protective layer to the inner and outer surfaces of the pipe.

e. Allowing the pipe to cool.

f. Application of a cement mortar lining (where applicable).

All parts of the method of this preferred embodiment are completed off site with the exception of the final preparation for the joining method, which is done by the following steps:

a. Removal of the plastic coating around the end of the pipe socket at location (7).

b. Removal of the coating on the top of the heat sink member at location (9).

c. Fitting of a elastomeric seal to the socket groove.

d. Application of lubricant to the surface of the spigot.

e. Pushing the spigot into the socket to the required position.

f. Welding the extended lip to the heat sink member (weld 14).

g. Overlaying the exposed steel surface with a heat shrink sleeve (not shown).

The important aspects of this preferred embodiment of the invention can be summarized as follows:

a) The Extended Lip Area (From Location 13 to Location 7).

This is the area that overlaps the heat sink member on the spigot of the pipe and enables it to be fillet welded to the band. The inside diameter of this area should be controlled within tight limits. If this diameter is too small it will either not fit over the heat sink member or will not allow the required deflection of the joint. If it is too large the gap between the lip and the heat sink member will be too large to accommodate a fillet weld. This diameter is determined by control of the initial expansion and a combination of forming dies and coating techniques that maintain the relationship between it and the inside diameter of the lip (13, after coating) and the groove (6, after coating).

b) The Inside Diameter of the Lip (13) After Coating.

The finished inside diameter of the lip after coating is one of the important dimensions in the joint. In combination with the outside diameter of the particular spigot fitted to the socket it determines the maximum gap that is possible in the joint. If this gap is too large the elastomeric ring seal can be extruded through the gap by the action of the internal fluid pressure. If there is no gap or interference then it may not be possible to make the joint. This diameter is controlled by a combination of the initial socket expansion, size and shape of the rolling dies and control of the coating parameters.

c) The Sealing Groove (6).

There are several key aspects involved the sealing groove, all of which should be controlled by the manufacturing process. Firstly the internal diameter after coating should be held within tight limits as this determines, in combination with the spigot (4), how much initial compression is exerted on the elastomeric (rubber) seal (8). Too much compression on the rubber seal may render the joint impossible to join. Too little compression and the seal may leak and not perform its required function. Secondly the shape of the groove is also important to the secure location of the seal. The coated groove must be shaped such that it matches the shape of the rubber seal to ensure that the rubber seal does not either rock nor slide back and forward in the groove. Either situation can cause the elastomeric seal to be dislodged during assembly of the joint. The finished size and shape of the groove are dies and careful control of the coating parameters.

d) The Outside Diameter of the Spigot (4) After Coating.

This diameter is also important to the performance of the elastomeric seal. This diameter is controlled during the pipe manufacturing process and by careful control of the coating parameters.

e) The Outside Diameter of the Heat Sink Member (9).

This dimension is important in determining the weld gap (14).

f) The Distance Between the Weld Gap Point (14) and the Socket Groove (16).

This distance is also important and was determined by extensive experimentation to be the minimum distance that heat during formation the weld (14) will not cause softening of the internal groove coating that would then lead to reduction in the compression of the elastomeric seal (8).

g) The Width and Thickness of the Heat Sink Member (9).

This member (band) absorbs and dissipates heat during formation of the weld (14), thereby preventing the temperature on the adjacent inside surface of the pipe (11) from rising to a level that would cause damage to the lining of the pipe. The width of the heat sink member must also take into account the axial location at the joint (15) caused by the deflection angle of the pipe.

The present invention therefore provides an improvement to prior art methods by adopting a number of steps that together result in a coating that is dimensionally consistent and provides improved joint integrity. The extended lip provided to complete the joining restraint introduces another level of complication into the control process and necessitates a major revision in the manufacturing process to enable all of the exacting tolerances to be met.

The polyethylene coating (2) extends around exterior of the socket (5) end and continues internally. The socket (5) end has its inner surface coated with the polyethylene coating (2) along its length and meets the cement mortar lining (3) which protects the remaining internal length of the pipe (1).

The methodology of the present invention seeks to improve the production of steel elastomeric jointed pipes as mentioned above.

Joint formation is effected in the following manner:

The pipe is produced initially with the spigot end of the body of the spigot and sized to mate the socket within ±0.5 mm, and limiting the diameter at a point, 120 mm from the end of the spigot. A reduction of the thickness of the pipe is introduced at the very end of the spigot to permit ease of entry into the socket during assembly.

Larger diameters of the socket will cause assembly difficulties in the field that could render the joint impossible to assemble. Lower diameters below nominal will reduce seal pre-compression which provides the initial seal, and eliminates external root penetration through the joint, provides circumferential rounding forces on the socket to reduce localized lip gaps to below the critical level of 2 mm, and therefore eliminates the chance of seal dislocation.

The diametric dimensions of the socket for each specific pipe size are designed taking into account the final outside diameter of the spigot and the thickness and tolerance of the corrosion protection coating. The rolled socket demands precise rolling die dimensions and settings to ensure reproducibility The socket diameter at a position just inward of the groove is controlled during the first expansion process to be 6 mm greater than that of the finished lip inside diameter. This allows for minor adjustments in the finished lip inside diameter to be made by minute adjustments to the initial expansion. The expansion is determined by register settings in a programmable controller with digital readout enabling adjustments as small as 0.1 mm in diameter. This vastly improves production process results in very little need for corrective action and simplifies the production demands on the operator. Any undersized products can simply be reprocessed as normal pipes. Oversized ends need to be scrapped.

Surface Preparation

The next step in the process is to prepare the pipe surface in order to enable application of the corrosion protection layer. Sound adhesion between the corrosion protection layer and the substrate is obtained principally due to "Anchor pattern" effects (a term well known in the art). Optimum pattern conditions are achieved by the use of steel grit abrasive conforming to 'running mixes" (also a term well known in the art) of the following graduation:

| μm Passing | % |
|---|---|
| 840 710 | 12.8 27.0 |
| 600 500 | 28.5 14.5 |
| 425 355 | 9.2 4.7 |
| 300 | 3.3 |

TAKEOUT SIZE 177

AS 1627 Part 4 Class 2.5-3 with profile height of 50-75 μm Rtm and 85-95 Rt.

The internal surfaces of the joint ends are prepared simultaneously with the external process by selective rotational/travel delays when the critical joint areas are located in the "Hot Spot" (also a term well known in the art) region of the blast machine. Both direct and reflective particle impingement maintains profile character in the socket region including the faces outside the direct line of the particle trajectory.

Where the entire internal surface of the pipe is to be coated (lined) with polyethylene the inside surface is also blasted in another blasting machine specifically designed for internal blasting, to produce a surface texture and state of cleanliness equivalent to the outside surface.

Heating

The next step is to heat the pipe to the correct temperature gradient prior to coating the pipe with the protective layer.

Direct flame impingement heating with additional and independent open flame end heaters is located at 6 o'clock providing energy at 150,000 KJ/m. Pipe rotation of 7-12 rev/min is used during this heat cycle which varies from 4-15 min and is dependent on the pipe mass. Temperature gradients are controlled such that 1-2 m of the pipe ends are held at 40°±5° C. above the pipe body temperature but not exceeding 400° C., at the time of discharge from the oven.

To balance the pipe end cooling effects, the pipe socket end temperature should be held to 30°±5° C. above the pipe body temperature with a maximum of 345° C., when the pipe dipping operation commences.

For sound adhesion to be obtained, it is important that the above temperature controls and the following lower limits on dip temperature should be observed.

| 280° C. and | 10 mm wall thickness |
|---|---|
| 300° C. | 6 mm wall thickness |
| 320° C. | 5 mm wall thickness |
| 340° C. | 4.5 mm wall thickness |

Stabilising

The stabilizing process step follows in which the temperature of the socket and spigot ends are corrected to, and stabilized at, the required levels for accurate coating thickness application by the use of localized heating or cooling equipment as appropriate.

Pre-coating

Prior to dipping the pipe into a coating bath, the external surface of the socket end should be precoated to a thickness of 1 mm±0.25 mm using a method of application which prevents any excess oxidized powder from returning to the bath. This precoat provides a balance between internal and external deposition rates and ensures correct final coating thicknesses on both internal and external surfaces.

Coating

The coating process step, which is a time/temperature function, follows.

The pipe is rotated at 5-10 rev/min, while immersed to 30% of its diameter in the fluidised polyethylene bath, held at 25-60° C. Higher temperatures increase the rate of fusion onto the pipe. Immersion times vary between 1.5-4 minutes, which provides the necessary time to deposit coating thicknesses.

High socket temperatures require the separate pre-coating of the socket external surface prior to immersion to balance internal and external socket thicknesses and avoid oxidation of bath powders Where the pipe is to be fully polyethylene lined a measured quantity of powder is introduced into the inside of the pipe after the pipe has been lowered into the powder for external coating.

Some additional heat may be introduced during this process by the application of a full length induction heating coil. Subsequent post heating of the pipe ends may be required when the pipe wall thickness is 5 mm or below.

Cooling

Cooling of the pipe is the next step and is carried out by natural or fan assisted airflow which lowers the temperature from 200° C.±20° C. to 60° C. within a time limit of not less than 20 minutes.

Buffing

Bevelling of the internal termination of the coating is required when another product, for example, a cement mortar lining is to be applied. Buffing bevelling of the coating terminations at 1:3 tapers follows the cooling step.

Cement Mortar Lining

When required, a cement mortar lining can be applied to the inside surface of the pipe and overlaps the termination of the polyethylene at the ends so producing a continuous protection to the internal steel surface.

Elastomeric Rings

Elastomeric rings of a suitable type are utilized for the sealing means of the pipe joint.

The present invention therefore provides a method for producing a restrained joint that can be welded on-site without affecting the continuous internal corrosion barrier on the coated and lined pipes.

The invention claimed is:

1. A pipe joint between two metallic pipes which have been internally and externally coated with a material to prevent corrosion, said joint comprising:
   a spigot disposed on a first of said two metallic pipes;
   a socket disposed on a second of said two metallic pipes having an internal circumferential groove;
   an elastomeric sealing ring disposed in said groove;
   a lip disposed along said socket and extending from said groove to an end of said socket, said lip providing a welding location remote from the sealing ring, said end of said socket not being coated with said material to prevent corrosion;
   a heat sink member to disposed on said spigot, said heat sink member being a metal band with a substantially rectangular cross-section attached to and extending circumferentially around said spigot, said heat sink member configured to enable welding of said socket end without causing a critical rise in temperature of an inside surface of at least one of said metallic pipes;
   a weld joint region disposed along said socket between said lip and said welding location, said weld joint region formed in an area between a portion of said lip, said heat sink member and said spigot, said weld region being remote from the sealing ring wherein said sealing ring prevents fluid from entering the weld joint region; and
   a weld connection the lip to the heat sink member at said welding location.

2. The pipe joint as claimed in claim 1, wherein the second of said two metallic pipes is coated both internally and externally with the material to prevent corrosion and the exterior of the spigot is coated with the material to prevent corrosion except at the location upon which the heat sink is disposed.

3. The pipe joint of claim 1, wherein said second of said two metallic pipes is coated both internally and externally with the material to prevent corrosion except at the end of the socket, said spigot having an exterior surface wherein said exterior surface is coated with the material to prevent corrosion except at the location upon which the heat sink is disposed.

4. A method of forming a pipe joint between spigot and socket ends of a pair of metallic pipes which have been internally and/or externally coated with a material to prevent corrosion, said method including:
   forming a groove in the socket to provide a seat for a sealing ring;
   forming a lip in the socket to enable said socket to overlap a heat sink member on the spigot, said heat sink member being disposed on said spigot,
   welding said lip to said heat sink member at a welding location, said lip including an extension portion; and
   forming a weld joint region disposed along said socket between said lip and said welding location, said weld joint region formed in an area between a portion of said extension, said heat sink member and said spigot, said weld region being remote from the sealing ring wherein said sealing ring prevents fluid from entering the weld joint region.

5. The method of claim 4, wherein the steps of forming said groove, forming said lip, and disposing said heat sink member on said spigot are performed off, or at, the site where the joint between the pipes is to be made.

6. The method of claim 5 further comprising: heating the pipes to a determined temperature; and
   immersing said heated pipes in a fluidized bed of the material to prevent corrosion off, or at, the site where the joint between the pipes is to be made.

7. The method of claim 6, wherein prior to the step of immersing the pipes in the fluidized bed of the material to prevent corrosion, the surfaces of the pipes to be coated are grit blasted.

8. The method of claim 4, wherein the method further includes:
   heating the pipes to a predetermined temperature; and
   immersing the pipes in a fluidized bed of the material to prevent corrosion off, or at, the site where the joint between the pipes is to be made.

9. The method of claim 8, wherein prior to immersion in the fluidized bed of the material to prevent corrosion, the surfaces which are to be coated are grit blasted.

10. The method of claim 4 further including the step of removing the material to prevent corrosion from the lip of the socket and the heat sink member off, or at the site where the joint between the pipes is to be made.

* * * * *